United States Patent
Eleftheriou et al.

(10) Patent No.: US 8,924,513 B2
(45) Date of Patent: Dec. 30, 2014

(54) STORAGE SYSTEM

(75) Inventors: Evangelos S Eleftheriou, Rueschlikon (CH); Robert Haas, Rüeschlikon (CH); Xiaoyu Hu, Rüeschlikon (CH); Ilias Iliadis, Rüeschlikon (CH)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 12/831,326

(22) Filed: Jul. 7, 2010

(65) Prior Publication Data

US 2011/0010434 A1 Jan. 13, 2011

(30) Foreign Application Priority Data

Jul. 8, 2009 (EP) .................................... 09164946

(51) Int. Cl.
*G06F 15/16* (2006.01)
*H04L 29/08* (2006.01)
*H04L 29/12* (2006.01)
*H04L 29/06* (2006.01)

(52) U.S. Cl.
CPC ........ *H04L 67/1095* (2013.01); *H04L 61/1582* (2013.01); *H04L 67/1097* (2013.01); *H04L 69/28* (2013.01)
USPC .......................................... 709/219; 709/217

(58) Field of Classification Search
USPC .................................................. 709/219, 217
See application file for complete search history.

(56) References Cited

U.S. PATENT DOCUMENTS 8,086,585 B1 * 12/2011 Brashers et al. ............... 707/705
8,464,074 B1 * 6/2013 Parthasarathy et al. ........ 713/193
2002/0188881 A1 * 12/2002 Liu et al. ........................ 713/401
2008/0288580 A1 * 11/2008 Wang et al. .................... 709/203
2009/0177721 A1 * 7/2009 Mimatsu ........................ 707/205
2009/0259665 A1 * 10/2009 Howe et al. ..................... 707/10

OTHER PUBLICATIONS

S. Ratnasamy et al., "A Scalable Content-addressable Network," Proc. SIGCOMM (Aug. 2001), pp. 161-172.
I. Stoica et al., "Chord: A Scalable Peer-to-Peer Lookup Service for Internet Applications," Proc. SIGCOMM (Aug. 2001), pp. 149-160.
B. Y. Zhao et al., "Tapestry: An INfrastructure for Fault-Tolerant Wide-Area Location and Routing," Tech. Rep. USB/CSD-01-1141, CS Division, UC Berkeley, Apr. 2001.
A. Rowstorn et al., "Pastry: Scalable, Distributed Object Location and Routing for Large-Scale Peer-to-Peer Systems," Proc. Middleware 2001 (Nov. 2001), pp. 329-350.
D. Giuseppe et al., "Dynamo: Amazon's Highly Available Key-Value Store," Proc. SOSP (Oct. 2007).

* cited by examiner

*Primary Examiner* — Dustin Nguyen
*Assistant Examiner* — Joel Mesa
(74) *Attorney, Agent, or Firm* — Tutunjian & Bitetto, P.C.; Jennifer R. Davis

(57) ABSTRACT

A pseudo peer-to-peer network system including several clients, each adapted to execute a path driver program. A path driver program is provided, including the steps of locating storage peers connected to the network via a network interface for storing or accessing data items provided in memories of storage peers by means of a global address table. The global address table is updated periodically by at least one configuration server of the pseudo peer-to-peer network. The network further includes at least one time server, which generates a global time clock to which local time clocks of all storage peers of the pseudo peer-to-peer network are synchronized such that a global address table updated by the configuration server is activated by all storage peers at the same scheduled time to be consistent throughout the pseudo peer-to-peer network at all times.

20 Claims, 5 Drawing Sheets

STORAGE SYSTEM

CROSS-REFERENCE TO RELATED APPLICATION

This application claims priority under 35 U.S.C. §119 from European Patent Application No. 09164946.7 filed Jul. 8, 2009, the entire contents of which are incorporated by reference herein.

BACKGROUND OF THE INVENTION

1. Field of the Invention

The invention relates to a storage system. More particularly, the present invention relates to a coordinated storage system for a peer-to-peer network.

2. Description of the Related Art

Conventional storage systems such as network attached storage systems (NAS) and storage area network systems (SAN) suffer from limited scalability, and their performance and reliability are dependent on the performance and reliability of their respective components.

Peer-to-peer systems become more and more widespread in distributed applications because of the simple and scalable architecture of peer-to-peer systems. A pure peer-to-peer network consists of a collection of peer nodes that operate exactly in the same way, that is, there is no distinction between peer-to-peer nodes in terms of functionality. A peer-to-peer network typically employs a distributed hash table (DHT) to provide a look-up service for locating a data object such as a stored file from a group of peers. A peer-to-peer network architecture is a promising architecture because of its good scalability, load balancing and fault tolerance. However, conventional peer-to-peer networks lack high level management functions due to the absence of a global view of the system's state. Conventional peer-to-peer systems have been applied to distributed storing or sharing of data and files in wide area network (WAN) environments and are rarely found in corporate computing infrastructures because of the missing high level management functions.

Conventional main stream architectures for a corporate level storage system consist of network attached storages and storage area networks. These conventional network architectures have a limited degree of scalability because a portion of the data or metadata access goes through a centralized server. Therefore, conventional NAS and SAN based storage systems become increasingly insufficient in meeting the growing demand for more and more storage capacity. Another limiting factor of conventional NAS and SAN architectures is that they are designed and built using more reliable components to achieve a low fault tolerance. However, these components are generally very expensive. As storage systems grow larger and larger to meet the growing demand for storage capacity, less reliable components such as commodity hardware are introduced for cost efficiency reasons. Consequently, the fault tolerance of a conventional NAS and SAN storage system becomes less.

FIG. 1 shows a diagram of a pure peer-to-peer storage system. Such a conventional peer-to-peer system relies on distributed protocols to maintain network connectivity and health state of peers such as storage peers. These distributed protocols need a high bandwidth and high algorithm complexity.

A major disadvantage of a pure peer-to-peer network architecture as shown in FIG. 1 resides in its lack of global state information being available in the whole system.

Accordingly, there is a need for a storage system with an architecture, which avoids broad bandwidth usage and high complexity.

SUMMARY OF THE INVENTION

In one aspect, the present invention provides a storage system including clients, each adapted to execute a path driver, which locates storage peers for storing, or access data items provided in the storage peer by means of a global address table, which is updated periodically by at least one configuration server of the system, wherein at least one time server is provided to synchronize local time clocks of all storage peers with a global time clock of the time server such that the updated global address table is activated at all storage peers at the same scheduled time.

In another aspect, the present invention further provides a storage peer for a pseudo peer-to-peer network including: a network interface to the network; at least one memory to which virtual storage cells are assigned and which replicas of data items are stored in the virtual storage cells; a processing unit for performing storage related operations with the data items; a global address table, which is periodically updated by at least one configuration server of the network, wherein a local time clock of the storage peer is synchronized with a global time clock of a time server of the network such that the updated global address table of the storage peer is activated at a scheduled time, which is broadcasted by the configuration server or pulled from the configuration server along with the updated global address table each time the global address table is updated by the configuration server.

In still another aspect, the present invention further provides a time server for a pseudo peer-to-peer network including a timer to generate a global time clock to which local time clocks of all storage peers of the network are synchronized such that a global address table updated by a configuration server of the network is activated by all storage peers at the same scheduled time.

In yet another aspect, the present invention further provides a pseudo peer-to-peer network including several clients each adapted to execute a path driver program, which locates storage peers connected to the network interface for storing or accessing data items provided in memories of the storage peers by means of a global address table, which is updated periodically by at least one configuration server of the pseudo peer-to-peer network, wherein at least one time server of the pseudo peer-to-peer network is provided to generate a global time clock to which local time clocks of all storage peers of the pseudo peer-to-peer network are synchronized such that the global address table updated by the configuration server is activated by all storage peers at the same scheduled time to be consistent throughout the pseudo peer-to-peer network at all times.

In a further aspect, the present invention further provides a path driver program executed by a client of a pseudo peer-to-peer network including the step of locating storage peers to store or access data items in virtual storage cells of the storage by means of a global address table loaded by the client from a configuration server which updates the global address table, wherein local time clocks of all storage peers are synchronized with a global time clock such that the updated global address table is activated at all storage peers at the same scheduled time.

In a still further aspect, the present invention further provides a data carrier, which stores a path driver program executed by a client of a pseudo peer-to-peer network, which locates storage peers to store or access data items in virtual storage cells of the storage peers by means of a global address table loaded by the client from a configuration server, which updates this global address table, wherein local time clocks of all storage peers are synchronized with a global time clock such that the updated global address table is activated at all storage peers at the same scheduled time.

DETAILED DESCRIPTION OF THE PREFERRED EMBODIMENTS

A preferred embodiment for the present invention will be described below in detail on the basis of the drawings. However, the embodiment below is not intended to limit the present invention to the scope of the claims, and all the combination of the characteristics described in the embodiment are not necessarily indispensable for solution means of the invention. The same reference numbers are given to the same elements through the whole description of the embodiment.

Figure 2:
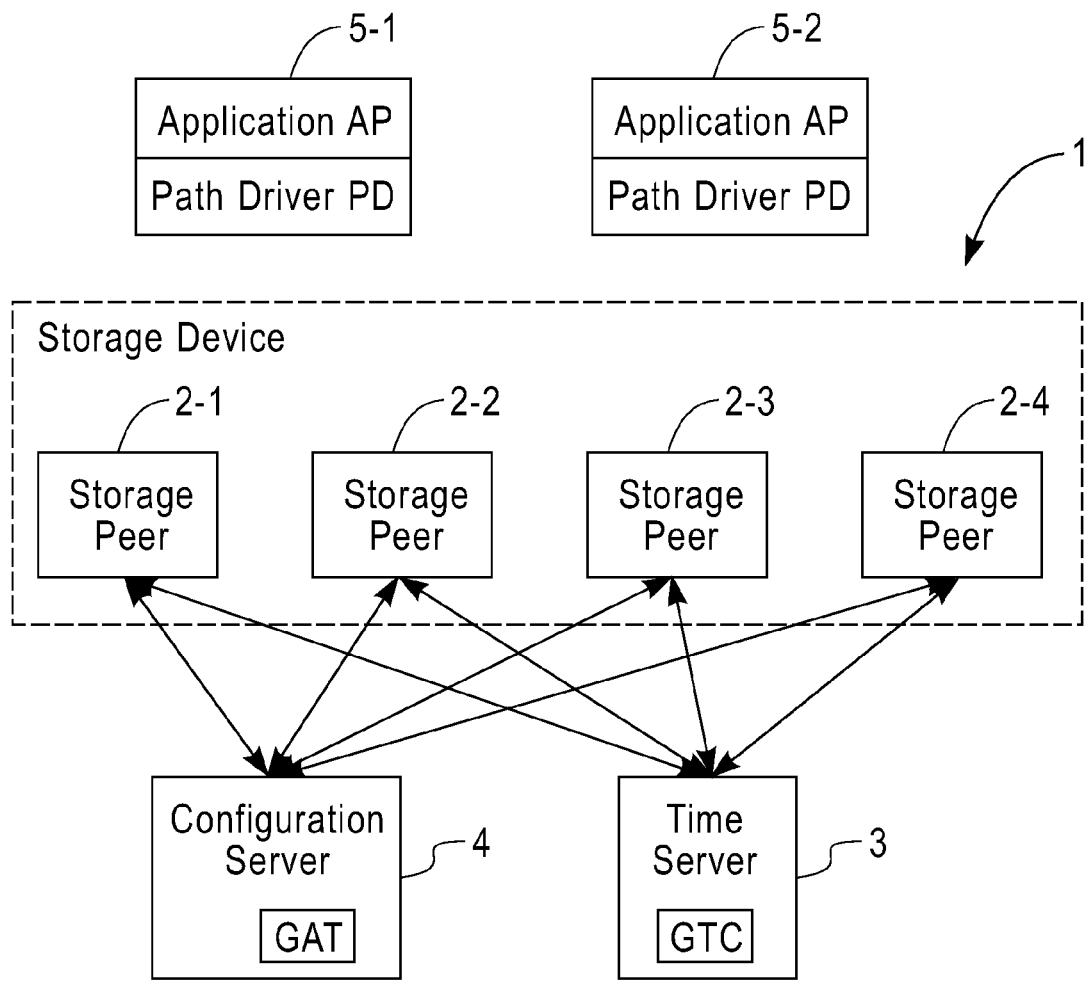
FIG. 2 shows a block diagram of an embodiment of the storage system according to the present invention.

As can be seen from FIG. 2, a storage system 1 according to the present invention includes in the shown embodiment several storage peers 2-1, 2-2, 2-3, 2-4 which store data items. A time server 3 is provided to synchronize local time clocks (LTC) of all storage peers 2-i in the storage system 1 with a global time clock (GTC) of the time server 3. Further, a configuration server 4 is provided including a global address table (GAT), which is periodically updated by the configuration server 4.

Furthermore, the storage system 1 according to the present invention includes one or several clients or peers 5-1, 5-2, which are adapted to execute a path driver (PD), which locates storage peers 2-i for storing or accessing the data items stored in the storage peers 2-i by means of the global address table GAT, which is updated periodically by the configuration server 4 of the system 1.

Accordingly, the coordinated pseudo peer-to-peer storage system 1 as shown in FIG. 2 is composed of three major entities, that is one or several client or peers 5-i running a path driver (PD) to locate storage peers, multiple storage peers 2-i that store data objects or data items and provide storage related functions such as read, write, update and special purpose servers 3, 4 that configure and coordinate the behaviour of the storage peers 2-i. These special purpose servers can be formed by the configuration server 4 and the time server 3 as shown in the embodiment of FIG. 2. In an alternative embodiment, the functionality of the configuration server 4 and the time server 3 is provided by one server managing the global address table (GAT) and the global time clock (GTC).

The storage system 1 as shown in FIG. 2 provides a collection of storage peers 2-i made available to users or applications of the storage system 1 through path drivers (PD) at the clients' 5-i. Furthermore, the storage system 1 provides special purpose servers 3 and 4, which are transparent to the users and applications run by the clients 5-i for configuring and coordinating the storage peers 2-i.

Through the configuration servers 4, a path driver (PD) run by a client 5-i can find the right storage peers for storing and accessing data items. The other special purpose server, that is the time server 3 as shown in the embodiment of FIG. 2, is provided to synchronize the clock of the individual storage peers such that all storage peers 2-i can be configured with a single consistent routing table at the same scheduled time, that is, at the same specific point of time.

Figure 1:
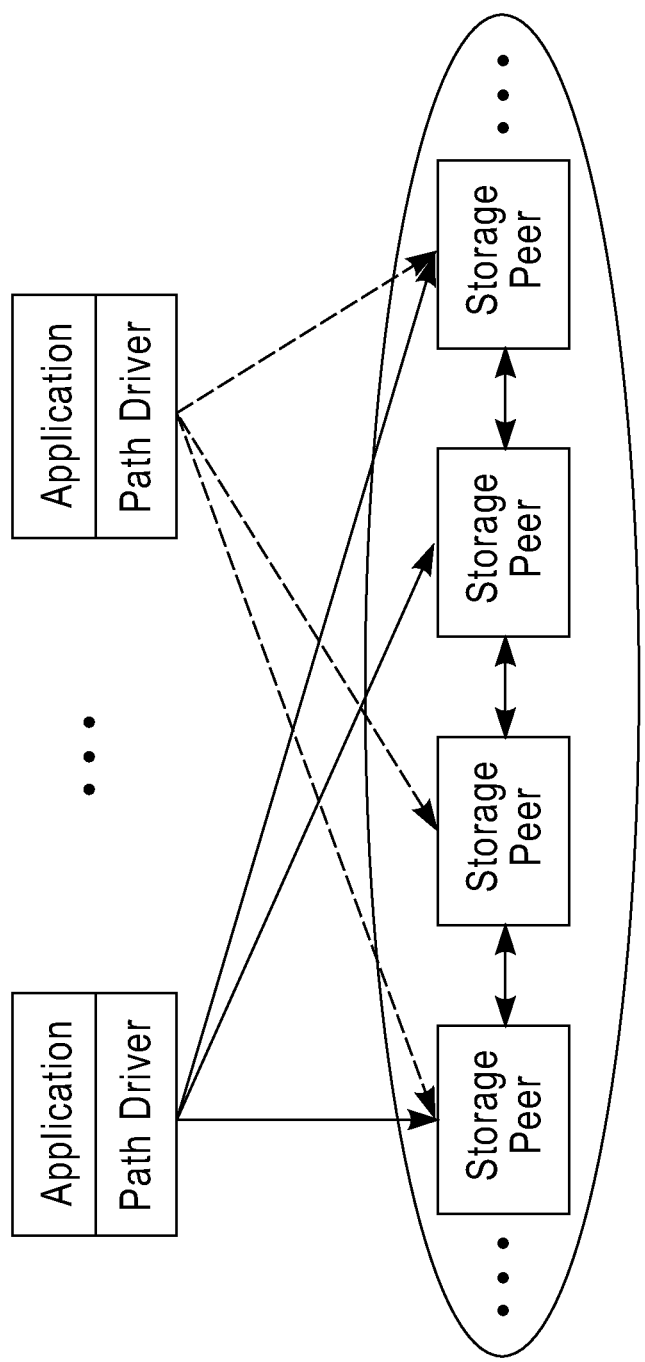
FIG. 1 shows a conventional peer-to-peer storage system.

In the storage system 1, according to the present invention as shown in FIG. 2, the coordination of the storage peers 2-i is accomplished by centralized servers 3 and 4 instead of distributed protocols as done in the conventional system as shown in FIG. 1.

In an embodiment of the storage system 1, as shown in FIG. 2, the configuration server 4 broadcasts the updated global address table (GAT) along with the scheduled time to each storage peer 2-i, which stores locally a copy of the updated global address table (GAT) in a local memory.

In an alternative embodiment, the updated global address table (GAT) along with the scheduled time is pulled by each storage peer 2-i, which stores locally a copy of the updated local address table in its memory.

In both embodiments, the configuration server 4 keeps a record of all available storage peers 2-i and a routing table is established indicating how a calculated hash value must be linked to a storage peer. This routing table or global address table (GAT) is provided by the configuration server 4 either by broadcast or by pulling to every storage peer 2-i through which a path driver (PD) then obtains the global address table (GAT) for the purpose of finding an appropriate path for data requests. The storage peers 2-i periodically synchronize the local time clocks (LTCs) with the help of the time server 3 so that the global address table (GAT) becomes effective at exactly the same (future) point in time as all storage peers or storage nodes 2-i.

The path driver (PD) executed by a client 5-i is in an embodiment able to calculate a virtual storage cell identifier of a virtual storage cell (VSC) for storing or accessing a data item (DI) depending on a data item identifier (DI-ID) issued by a data request of an application program run by the client 5-i. When the path driver (PD) receives the data request, the path driver (PD) calculates in a possible embodiment by means of a predetermined hash function H a hash value of the data item identifier (DI-ID). The path driver (PD) hashes the request using the data item identifier (DI-ID) such as a data item name. Then, the path driver (PD) directs the request to the correct storage peers 2-i based on the entry for this calculated hash value in the updated actual global address table (GAT) stored in the respective memory. Upon receiving the request from the path driver (PD) the respective storage peer or storage peers 2-i respond accordingly.

To deal with failures in the storage system 1 or to adapt the storage system 1, according to the present invention, to different routing configurations such as adding or removing a storage peer or several storage peers 2-i, the status information or error information is reported to the configuration server 4 of the system 1. The configuration server 4 proactively keeps track of the status of the storage peers 2-i and periodically updates the storage peers 2-i with its latest changes in the global address table (GAT).

Each data item (DI) stored and accessible in a storage peer 2-i has a name or, more generally, a universal resource locator (URL), which is referred to as the data item identifier (DI-ID).

In a possible embodiment, the path driver (PD) calculates by means of a predetermined hash function H a hash value of the data item identifier (DI-ID). This hash function H can be formed in a possible embodiment by SHA-1 yielding a string of m bits. Accordingly, the calculated hash value includes m bits, which are prefixed in a possible embodiment by a service level agreement identifier (SLA-ID) of a service level agreement (SLA) including s bits to form a virtual storage cell identifier (VSC-ID). The path driver (PD) executed by a client 5-$i$ accordingly calculates a virtual storage cell identifier (VSC-ID) of a virtual storage cell (VSC) for storing or accessing a data item (DI) depending on the data item identifier (DI-ID) issued by the data request of an application program run by the respective client 5-$i$. The s bit long prefix is used to specify a service level agreement (SLA), which can be formed by a service level agreement (SLA) between the application and the storage system. In this embodiment, both the path drivers (PD) run by the client and the storage peers 2-$i$, are configured to be aware of the service level agreement (SLA) and the storage peers 2-$i$ act appropriately according to the service level agreement (SLA) when handling the data requests.

Figure 3:
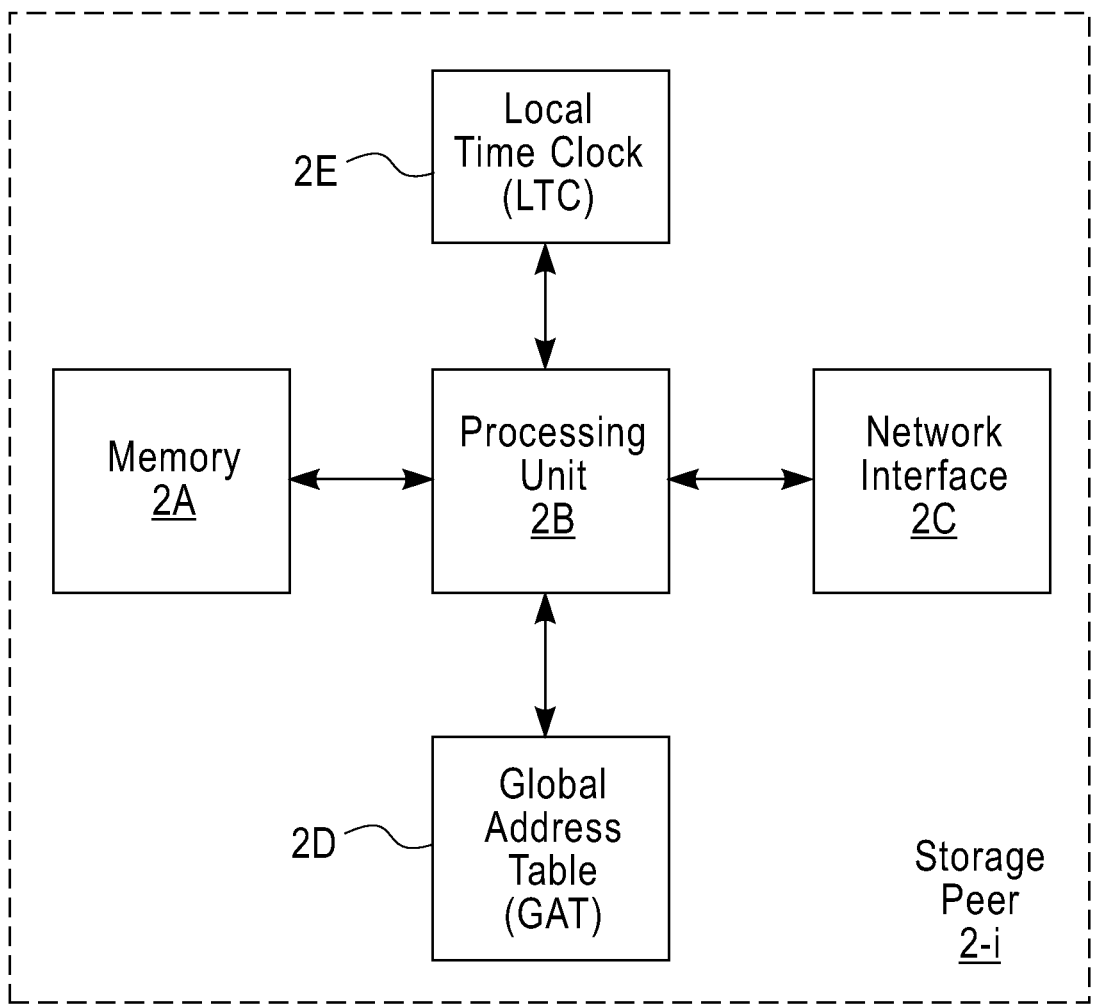
FIG. 3 shows a block diagram of an embodiment of a storage peer as employed in a storage system according to the present invention.

FIG. 3 shows a possible embodiment of a storage peer 2-$i$ as employed in the storage system 1 according to the present invention. In this embodiment the storage peer 2-$i$ includes at least one memory 2A to which virtual storage cells (VSC) are assigned and in which replicas of data items (DI) are stored in the virtual storage cells (VSCs).

Further, the storage peer 2-$i$ includes a processing unit 2B for performing storage related operations with the stored data items (DI) and communicating with other storage peers 2-$i$ as well as with clients 5-$i$ and servers 3 and 4 via a network interface 2C.

The storage peer 2-I, as shown in FIG. 3, includes another memory 2D for storing a global address table (GAT), which is periodically updated by the configuration server 4 of the storage system 1. The storage peer 2-$i$ receives the actual updated global address table (GAT) and stores it locally in its memory 2D.

Furthermore, the storage peer 2-$i$ has at least one local timer or local time clock (LTC) register 2E. The local time clock (LTC) can be formed by a timer or counter. The local time clock (LTC) of the storage peer 2-$i$ is synchronized with a global time clock (GTC) of the time server 3 of the storage system 1 such that the updated global address table (GAT) stored in the memory 2D of the storage peer 2-$i$ is activated at a scheduled time. The scheduled time is broadcasted by the configuration server 4 or pulled from the configuration server 4 along with the updated global address table (GAT) each time the global address table (GAT) is updated by the configuration server 4. The updated global address table (GAT) stored in the memory 2D is then activated in the storage peer 2-$i$ at the same scheduled time as in the other storage peers 2-$i$ of the storage system 1.

Figure 4:
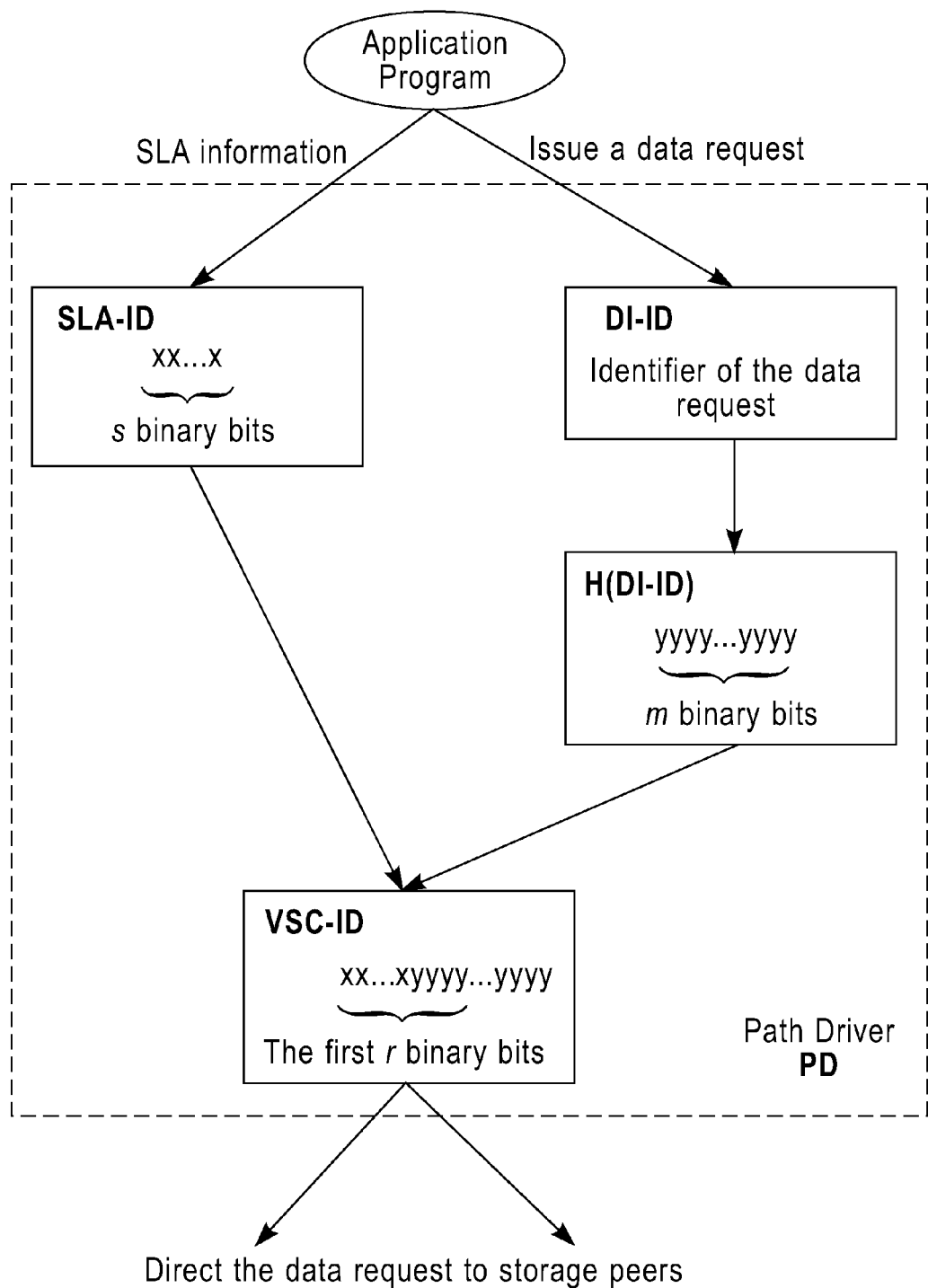
FIG. 4 shows a diagram for illustrating the functionality of a path driver as employed by the storage system according to the present invention.

FIG. 4 shows a diagram for illustrating the functionality of a path driver (PD) run by a client 5-$i$ of the system. An application or an application program run, for example by a microprocessor of the client 5-$i$, issues a data request to the path driver (PD). The path driver program executed by the client of the network locates storage peers 2-$i$ to store or access data items (DI) in virtual storage cells (VSC) of the respective storage peers 2-$i$ by means of the global address table (GAT) loaded by the client 5-$i$ from the configuration server 4 or pulled from the configuration server 4. The data request issued by the application program includes at least one data item identifier (DI-ID) for the respective data items (DI) to be stored or to be accessed. The path driver (PD) calculates, by means of a predetermined hash function H or another suitable function, a value, such as a hash value of the data item identifier (DI-ID) including in the example as shown in FIG. 4 m bits. In the given example, the application program further provides SLA (Service Level Agreement) information data to the path driver program consisting of s binary bits. In the example as shown in FIG. 4, the calculated hash value including m bits is prefixed with a service level agreement identifier (SLA-ID) of a service level agreement (SLA) including s bits to form a virtual storage cell identifier (VSC-ID).

A first group of r routing bits of the virtual storage cell identifier (VSC-ID) is used by the path driver (PD) to locate storage peers 2-$i$ for storing or accessing data items (DI) in the storage peers 2-$i$. The path driver (PD) uses the first r bits from left to right of the virtual storage cell identifier (VSC-ID), where r>s to locate the storage peers 2-$i$ for storage oriented operations based on the global address table (GAT). The routing table or global address table (GAT) is a collective map of the routing bits r for one or more storage peers 2-$i$, wherein the global address table (GAT) is coordinated by the configuration server 4, which is transparent to the application program. The first r bits of the concatenation of s bits of the service level agreement (SLA) and the m bits of the hash value of the data item identifier (DI-ID) are used by the path driver (PD) to identify storage peers 2-$i$ for operations.

The remaining (r-s) bits of the virtual storage cell identifier (VSC-ID) can be used to distinguish data items (DI) from different storage nodes or storage peers 2-$i$. Where there is a total of n data items (DI) stored in the storage system 1, each string of r routing bits can on average address $(n/2)^{r-s}$ data items to storage nodes. This range of storage spaces is referred to as a virtual storage cell (VSC) identified by the routing bits r. In a typical embodiment, a data item (DI), such as a file, is replicated and the virtual storage cell (VSC) is mapped into different storage peers 2-$i$ according to a replication factor (RF) carried within a virtual storage cell identifier (VSC-ID). Accordingly, a total number of virtual storage cells (VSCs) for the same virtual storage cell identifier (VSC-ID) is equal to the respective replication factor (RF).

Several replicas of each data item (DI) are stored in different storage peers 2-$i$ of the storage system 1. The replication factor (RF) indicates a number of replicas of data items (DI) and can be implicitly encoded in the service level agreement identifier (SLA-ID) of the virtual storage cell identifier (VSC-ID). Each storage peer 2-$i$ includes at least one memory for storing a number of virtual storage cells (VSCs) and a processing unit to perform the storage related operations with the respective data items (DI). In an update or write operation of the data item (DI) in a virtual storage cell (VSC), replicas of the data item (DI) are stored in memories of all storage peers 2-$i$ indicated by the global address table (GAT) of the storage system 1. An advantage of the use of virtual storage cells (VSC) lies in its static load balancing among a group of heterogeneous storage peers 2-$i$. The storage peers 2-$i$ are formed in a possible embodiment by a computer or computer machines, which can have variable capabilities in terms of CPU processing power, memory and disc capacity. In a possible embodiment of the present invention, multiple virtual storage cells (VSCs) are allocated to each storage peer 2-$i$ instead of a one-to-one mapping from a virtual storage cell (VSC) to a corresponding storage peer.

By implementing an appropriate value for parameter r, that is, number of routing bits, several or even up to 100 virtual storing cells (VSCs) can be assigned to each storage peer 2-$i$. The adjustment of the parameter r represents a system design point to achieve a trade-off between load balancing and management complexity. The smaller a virtual storage cell (VSC) is the finer the load balancing, but the greater the complexity in managing the global address table (GAT). In a typical embodiment, the number of virtual storage cells (VSCs) assigned to a storage peer 2-*i* can range between 10 and 100 virtual store cells (VSCs) per storage peer 2-*i*.

With the use of virtual storage cells (VSC), a storage peer 2-*i* of the storage system 1 hosts a number of virtual storage cells (VSCs) that is proportional to its capabilities, that is a powerful storage peer 2-*i* can implement a larger number of virtual storage cells (VSCs) than a relatively weaker storage peer, thereby achieving a static load balancing among the heterogeneous storage peers 2-*i* of the storage system 1.

Figure 5:
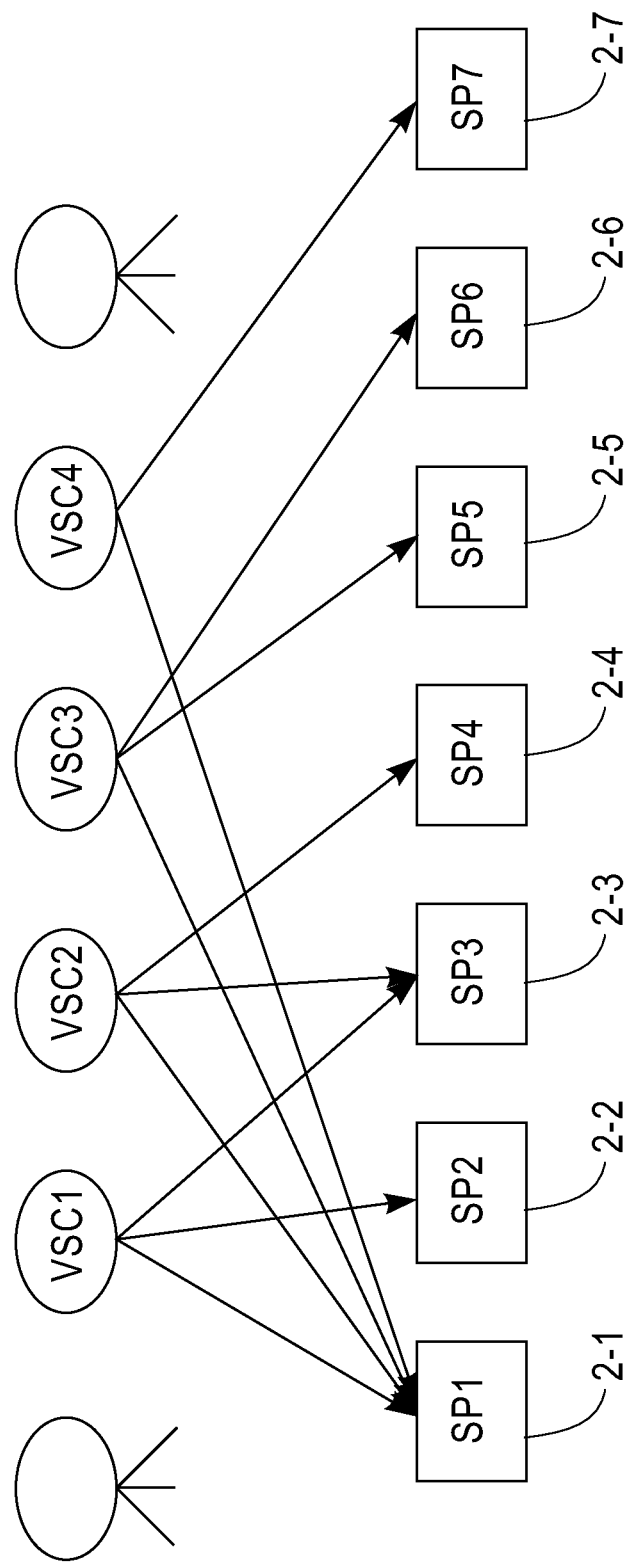
FIG. 5 shows a diagram for illustrating the assignment of virtual storage cells to storage peers as employed by the storage system according to the present invention.

FIG. 5 shows a diagram for illustrating the assignment of virtual storage cells (VSCs) to storage peers 2-*i*. A virtual storage cell (VSC) can be assigned to multiple storage peers 2-*i* based on its replication factor (RF) and a storage peer 2-*i* executes storage operations on behalf of all virtual storage cells (VSCs) assigned to it.

In the example as shown in FIG. 5, any data item (DI) falling into a virtual storage cell VSC-1 is stored at storage peers 2-1, 2-2, 2-3. For an update operation, all three copies of the data item (DI) are updated for consistency and fault tolerance, whereas for a read operation more flexibility can be provided. For a read operation either one data item (DI) is accessed out of the three copies or two out of the three copies are accessed or even all of them are accessed. The mapping or routing of information from the virtual storage cells (VSC) to storage peers 2-*i* can be represented by a bi-partite graph, where one set of nodes represents virtual storage cells (VSCs) and the other set of nodes represents storage peers 2-*i*. The connectivity of the two sets of nodes or the edge incidence matrix of the bi-partite graph forms the routing information decided at the central server and distributed to both storage peers 2-*i* and path drivers (PD) run on the clients 5-*i*.

In the example as shown in FIG. 5, there is a four cycle among storage peer 2-1, storage peer 2-3, VSC-1 and VSC-2 indicating that VSC-1 and VSC-2 have a share on both storage peers 2-1, 2-3. In this scenario, if storage peer 2-1 and storage peer 2-3 fail simultaneously, the virtual storage cell VSC-1 can only get service from storage peer 2-2 and virtual storage cell VSC-2 can only get service from storage peer 2-4.

For a large-scale storage system 1, there could be a case that more than two stored peers 2-*i* fail simultaneously. To reduce the probability of losing data and to reach a good level of reliability even in such an extreme situation the connectivity of the graph, that is, the bi-partite graph can have the property of good expander in a possible embodiment. This means that any subset of storage peers 2-*i* connects to as many virtual storage cells (VSC) as possible. Accordingly, in an embodiment of the present invention, good expander graphs can be used as the bi-partite graph to allocate VSC onto storage peers in the storage system 1. Another embodiment of the system is to use a random bi-partite graph without four cycles or six cycles.

With the storage system 1 according to the present invention, the advantages of a pure peer-to-peer architecture and client-server architecture are combined from a user or client point of view. The storage system 1 according to the present invention shows a similar behaviour as a pure distributed peer-to-peer system in the sense that data requests are directed based on hashing functions to a collection of storage peers 2-*i* for storage oriented operations wherein the user or the application is completely unaware of the existence of other entities that provide relevant system information services to the storage peers 2-*i*. The storage peers 2-*i* handle both meta data and data, performing the same set of storage oriented operations or services. Meanwhile all storage peers 2-*i* of the system are not aware of the existence of other peers and there is no need for a protocol among storage peers 2-*i* for a connectivity status as in a conventional peer-to-peer system. For the purpose of corporation, the storage peers 2-*i* of the system 1 according to the present invention, report their own state or access system wide information from one or more centralized servers. Accordingly, in the system 1 according to the present invention the coordination of the storage peers 2-*i* is accomplished by centralized servers instead of distributed protocols as done among storage peers in a conventional peer-to-peer system.

The present invention provides a coordinated storage system 1 using a modified peer-to-peer architecture. The data items (DI) are replicated and hashing functions are used to locate data items among storage peers 2-*i* for storage oriented operations. Instead of using a distributed protocol such as a gossip protocol in a peer-to-peer network to accomplish failure detection and membership likeliness the storage system 1 according to the present invention utilizes a system wide centralized management service. These centralized management services are normally run on one or more servers for handling system configuration and for adding or deleting storage peers 2-*i*.

From a user or client point of view the storage system 1, according to the present invention, behaves like a pure peer-to-peer system achieving superb availability or scalability and high performance in the sense that the user or client is completely unaware of the existence of any central service or centralized management services. From a system administration point of view the storage system 1 according to the present invention behaves like a centrally controlled system that can be easily configured and dynamically changed. All data related operations including meta data operations are executed in a peer-to-peer manner thus that the storage system 1 is highly available and scalable whereas the centralized management services of the system 1 render configuration and maintenance of the server system simply and reliable. The storage system 1 according to the present invention operates properly even if the centralized management services are temporarily unavailable, for example if the configuration server 4 or the time server 3 is temporarily not operating properly.

The pseudo peer-to-peer network according to the present invention can be formed by an open network or by a dedicated network. An open network, which connects the client 5, the storage peers 2-*i*, the time server 3 and the configuration server 4, can be formed in a possible embodiment by the Internet.

If the network is formed by a dedicated network to connect the clients 5, the storage peers 2-*i*, the time server 3 and the configuration server 4 this dedicated network can be formed in a possible embodiment by a local area network LAN of a company.

While the invention has been described in its preferred embodiments, it is to be understood that the invention is not limited to the embodiments. Rather, various changes in form and details may be made without departing from the spirit and scope of the invention as set forth in the claims.

What is claimed is:

1. A storage system, comprising:
   client device systems, each adapted to execute a path driver, which locates storage peers for storing or accessing data items provided in said storage peers using a processor by means of a global address table, which is updated periodically by at least one configuration server of said storage system, the path driver being configured to calculate a virtual storage cell identifier based on a data item identifier from a data request such that said storage peers are located based on an associated entry of the virtual storage cell identifier in the global address table, wherein a first group of routing bits of said virtual storage cell identifier is used by said path driver to locate storage peers for storing or accessing data items in said storage peers and a second group of remaining bits of said virtual storage cell identifier is used by said path driver to distinguish data items from different storage peers; and at least one time server having a processor configured to synchronize local time clocks of all storage peers with a global time clock of said time server such that said updated global address table is activated at all storage peers at a same scheduled time.

2. The storage system according to claim 1, wherein said configuration server broadcasts the updated global address table along with the scheduled time to each storage peer, which stores locally a copy of said updated global address table in a memory.

3. The storage system according to claim 1, wherein the updated global address table along with the scheduled time is pulled by each storage peer, which stores locally a copy of said updated global address table in a memory.

4. The storage system according to claim 1, wherein the path driver executed by said client calculates the virtual storage cell identifier of a virtual storage cell for storing or accessing a data item depending on the data item identifier issued by the data request of an application program run by said client.

5. The storage system according to claim 4, wherein said path driver calculates the virtual storage cell identifier of the virtual storage cell by means of a predetermined hash function a hash value of said data item identifier.

6. The storage system according to claim 5, wherein said calculated hash value comprising m bits is prefixed with a service level agreement identifier of a service level agreement comprising s bits to form said virtual storage cell identifier.

7. The storage system according to claim 4, wherein each storage peer comprises at least one memory for storing a number of virtual storage cells and a processing unit to perform storage-related operations with data items.

8. The storage system according to claim 7, wherein in an update or write operation of a data item in a virtual storage cell replicas of said data item are stored in memories of all storage peers indicated by the global address table of said storage system.

9. The storage system according to claim 7, wherein in a read operation of a data item at least one replica of said data item being stored in a memory of a storage peer indicated by said global address table is accessed.

10. The storage system according to claim 1, wherein several replicas of each data item are stored in different storage peers of said storage system.

11. The storage system according to claim 10, wherein a replication factor indicating a number of replicas of a data item is implicitly or explicitly encoded in said service level agreement identifier of said virtual storage cell identifier.

12. A storage peer for a pseudo-peer-to-peer network system, comprising:
a network interface to said network;
at least one memory to which virtual storage cells are assigned and in which replicas of data items are stored in said virtual storage cells;
a processing unit for performing storage related operations with said data items;
a global address table stored in a memory which is periodically updated by at least one configuration server of said network;

wherein a local time clock of said storage peer is synchronized with a global time clock of a time server of said network such that the updated global address table of said storage peer is activated at a same scheduled time as all other storage peers which is broadcasted by said configuration server or pulled from said configuration server along with the updated global address table each time the global address table is updated by said configuration server, wherein said storage peer is located by a path driver of a client system by calculating a virtual storage cell identifier based on a data item identifier from a data request such that said storage peer is located based on an associated entry of the virtual storage cell identifier in the global address table, and wherein a first group of routing bits of said virtual storage cell identifier is used by said path driver to locate storage peers for storing or accessing data items in said storage peers and a second group of remaining bits of said virtual storage cell identifier is used by said path driver to distinguish data items from different storage peers.

13. A pseudo-peer to peer network system, comprising:
several clients each having a processor and being adapted to execute a path driver program, which locates storage peers connected to said network via a network interface for storing or accessing data items provided in memories of said storage peers by means of a global address table, which is updated periodically by at least one configuration server of said pseudo-peer to peer network, the path driver program being configured to calculate a virtual storage cell identifier based on a data item identifier from a data request such that said storage peers are located based on an associated entry of the virtual storage cell identifier in the global address table, wherein at least one time server of said pseudo-peer to peer network is provided to generate a global time clock to which local time clocks of all storage peers of said pseudo-peer to peer network are synchronized such that the global address table updated by said configuration server is activated at all storage peers at a same scheduled time to be consistent throughout the pseudo-peer to peer network at all times, and wherein a first group of routing bits of said virtual storage cell identifier is used by said path driver program to locate storage peers for storing or accessing data items in said storage peers and a second group of remaining bits of said virtual storage cell identifier is used by said path driver program to distinguish data items from different storage peers.

14. The pseudo-peer-to peer network system according to claim 13, wherein the network is an open network.

15. The pseudo-peer-to-peer network system according to claim 14, wherein the open network, which connects the clients, the storage peers, the time server and the configuration server, is formed by the internet.

16. The pseudo-peer-to peer network according to claim 13, wherein the network is a dedicated network.

17. The pseudo-peer to peer network according to claim 16, wherein said dedicated network, which connects the clients, the storage peers, the time server and the configuration server, is formed by a local area network.

18. A path driver program stored on a non-transitory storage medium, executed by a client of a pseudo-peer to peer network, comprising the steps of:

locating storage peers using a processor to store or access data items in virtual storage cells of said storage peers by means of a global address table loaded by said client from a configuration server, which updates said global address table, wherein locating storage peers includes calculating a virtual storage cell identifier based on a data item identifier from a data request such that said storage peers are located based on an associated entry of the virtual storage cell identifier in the global address table;

wherein local time clocks of all storage peers are synchronized with a global time clock such that said updated global address table is activated at all storage peers at a same scheduled time, and wherein a first group of routing bits of said virtual storage cell identifier is used to locate storage peers for storing or accessing data items in said storage peers and a second group of remaining bits of said virtual storage cell identifier is used to distinguish data items from different storage peers.

19. A data carrier device, which stores the path driver program of claim 18.

20. A data storing subsystem for storing data comprising:

storage peers, the storage peers including a processor and memory, for storing data items, which are located by an updated global address table, wherein storage peers are identified by calculating a virtual storage cell identifier based on a data item identifier from a data request such that said storage peers are located based on an associated entry of the virtual storage cell identifier in the updated global address table wherein the local time clocks of said storage peers are synchronized with a global time clock such that the updated global address table is activated at all storage peers at a same scheduled time and wherein a first group of routing bits of said virtual storage cell identifier is used to locate storage peers for storing or accessing data items in said storage peers and a second group of remaining bits of said virtual storage cell identifier is used to distinguish data items from different storage peers.

\* \* \* \* \*